US011067868B2

(12) United States Patent
Ash et al.

(10) Patent No.: US 11,067,868 B2
(45) Date of Patent: Jul. 20, 2021

(54) THIN WIRE BUS BAR

(71) Applicant: GENTEX CORPORATION, Zeeland, MI (US)

(72) Inventors: Kevin L. Ash, Grand Rapids, MI (US); Gary J. Dozeman, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 119 days.

(21) Appl. No.: 16/355,951

(22) Filed: Mar. 18, 2019

(65) Prior Publication Data
US 2019/0294014 A1 Sep. 26, 2019

Related U.S. Application Data

(60) Provisional application No. 62/647,251, filed on Mar. 23, 2018.

(51) Int. Cl.
G02F 1/155 (2006.01)
G02F 1/161 (2006.01)
E06B 3/67 (2006.01)
C09J 9/02 (2006.01)
E06B 9/24 (2006.01)

(52) U.S. Cl.
CPC .............. *G02F 1/155* (2013.01); *C09J 9/02* (2013.01); *E06B 3/6722* (2013.01); *E06B 9/24* (2013.01); *G02F 1/161* (2013.01); *E06B 2009/2464* (2013.01); *G02F 2202/28* (2013.01)

(58) Field of Classification Search
CPC ...... G02F 1/155; G02F 1/161; G02F 2202/28; E06B 3/6722; E06B 9/24; E06B 2009/2464; C09J 9/02

USPC .................................................. 359/265–275
See application file for complete search history.

(56) References Cited

U.S. PATENT DOCUMENTS 5,124,833 A    6/1992  Barton et al.
6,449,082 B1   9/2002  Agrawal et al.
6,795,226 B2   9/2004  Agrawal et al.

OTHER PUBLICATIONS

International Search Report dated Jun. 27, 2019, for corresponding PCT application No. PCT/US2019/022670, 3 pages.
Written Opinion of the International Searching Authority dated Jun. 27, 2019, for corresponding PCT application No. PCT/US2019/022670, 5 pages.
International Preliminary Report on Patentablility dated Sep. 29, 2020, for correspondence PCT application No. PCT/US2019/022670, 6 pages.
Chinese office action dated Mar. 26, 2021, for corresponding Chinese application No. 201990000591.9, 2 pages.

*Primary Examiner* — William Choi
(74) *Attorney, Agent, or Firm* — Price Heneveld LLP; Bradley D. Johnson

(57) ABSTRACT

An electro-optic device comprises a first substrate having a rear surface and a second substrate having a front surface opposed to the rear surface of the first surface; a cavity defined between opposed surfaces of the first and second substrates; an electrically conductive coating disposed on the rear surface of the first substrate and the front surface of the second substrate; a metal strip extending at least partially around a circumference of one of the rear surface of the first substrate and the front surface of the second substrate; and a sealing member bonding first substrate and second substrate together in a spaced apart relationship; wherein the sealing member at least partially covers at least a portion of the metal strip.

16 Claims, 3 Drawing Sheets

THIN WIRE BUS BAR

CROSS REFERENCE TO RELATED APPLICATIONS

This application claims the benefit of and priority to U.S. Provisional Patent Application No. 62/647,251, filed on Mar. 23, 2018, entitled Thin Wire Bus Bar, the entire disclosure of which is hereby incorporated herein by reference.

FIELD OF THE DISCLOSURE

This disclosure relates generally to bus bars for electro-optic devices and particularly to low-profile bus bars having a uniform thickness to be used for electro-optic devices.

BACKGROUND

One current production method for constructing electro-optic windows, especially those for aerospace applications, entails coating a glass substrate with an electrically conductive coating, cutting the coated substrate to an appropriate size, applying a strip of conductive epoxy material around the perimeter of the substrate, and thermally curing the epoxy to form a conductive busbar. This busbar serves as the electrical conductor for conveying electrical charge from a controller through wiring across the electrically conductive coating on the surface of the glass substrate. Two of these busbar-bearing substrates are arranged in a parallel, spaced apart relationship in which the cell between them is filled with an electrochromic (EC) gel. The busbars transfer electrons to chromophores contained in the EC gel matrix, causing chromophores in the EC gel to undergo an oxidation reduction exchange. This oxidation reduction exchange causes largely colorless uncharged chromophores to become colored, charged species which exhibit light blocking characteristics.

A significant performance enhancement, especially in clearing times, can occur by reducing the spaced apart distance (cell spacing) between the two parallel substrates. However, the strip of conductive material has certain inherent limitations, particularly with respect to the resultant z-height (the height it stands above the substrate surface). Currently the average height of the strip of conductive material after thermal curing is approximately 150 microns. As a result, it is extremely difficult to reduce the cell spacing to less than 300 microns as this represents the physical limitations at which the opposing busbars would contact each other and cause an electrical short in the assembly. Simply reducing the z-height of the strip of conductive material may result in a less conductive busbar.

The conductive material has other drawbacks such as a difficulty in maintaining an even dispense height and width, and an inability to completely traverse the perimeter due to the fact that when the starting and stopping points of the applied conductive material overlap, the conductive material "mounds" into a higher dispense amount causing shorting of the final assembly. As a result, the dispense path of the conductive material is stopped before it meets the start point, resulting in a gap in the perimeter busbar.

Additionally, the conductive material may require a thermal cure, which requires a large capacity oven. The conductive material may also contain some solvents that need to be evaporated during the process.

SUMMARY

According to an some aspects, an electro-optic device may comprise a first substrate having a rear surface and a second substrate having a front surface opposed to the rear surface of the first surface; a cavity defined between the opposed rear surface of the first substrate and the front surface of the second substrate; an electrically conductive coating disposed on at least one of the rear surface of the first substrate and the front surface of the second substrate; a first metal strip having a first surface, a second surface, a thickness measured between the first surface and the second surface, and a width, extending at least partially around the circumference of one of the rear surface of the first substrate and the front surface of the second substrate; and a sealing member bonding first substrate and second substrate together in a spaced apart relationship; wherein the sealing member at least partially covers at least a portion of the second surface of the first metal strip.

The electro-optic device may further comprise a second metal strip having a thickness and a width; the second metal strip may extend at least partially around the circumference of one of the front surface of the second substrate and the rear surface of the first substrate; the second metal strip may be disposed on a different substrate than the first metal strip. The second metal strip may be disposed on the front surface of the second substrate. The second metal strip may have a thickness of less than 0.006 inches. The second metal strip may have a thickness of less than 0.004 inches. The second metal strip may have a thickness of less than 0.0026 inches. At least a portion of the second metal strip may have a width of less than 0.1 inch. At least a portion of the second metal strip may have a width of less than 0.0625 inches. The first metal strip may be disposed on and extend at least partially around a circumference of the rear surface of the first substrate. The first metal strip may comprise a conductive adhesive on the first surface. The adhesive may be a silver-loaded adhesive. The width of at least a portion of the first metal strip may be less than 0.1 inch. The width of at least a portion of the first metal strip may be less than 0.0625 inch. The first metal strip may have a thickness of less than 150 microns or 0.006 inches. The first metal strip may have a thickness of less than 100 microns or 0.0040 inches. The first metal strip may have a thickness of about 66 microns or 0.0026 inches. At least one wrapping portion of the first metal strip may extend from the sealing member. The at least one wrapping portion of the first metal strip extending from the sealing member may be configured to act as a solder pad. The first metal strip may have at least one wide portion; and the at least one wide portion may extend from the sealing member around an edge of the substrate and may be adhered to a second surface of the substrate. The electro-optic device may further comprise an electrochromic medium disposed within the cavity.

According to some aspects, a busbar/seal assembly for an electro-optic device may comprise a first metal strip and a second metal strip, each metal strip having a first side and a second side, comprising an adhesive layer on the first side of each of first and second metal strips; and a sealing member extending between at least a portion of the second side of the first metal strip and at least a portion of the second side of the second metal strip. Each of the first and second metal strips may have a width; and the width may be less than 0.1 inch. The width of at least a portion of the first and second metal strips may be less than 0.0625 inch. The adhesive may be a silver-loaded adhesive. The first and second metal strips may each have a thickness, and the thickness of each of the first and second metal strips may be less than 150 microns or 0.006 inches. First and second metal strips each may have a thickness of less than 100 microns or 0.004 inches. A portion of at least one of the first and second metal strips may extend outward from the sealing member. The portion of at least one of the first and second metal strips extending from the sealing member may be configured to act as a solder pad. At least one of the surfaces of at least one of the surfaces of the metal strip may be at least partially covered by an insulating material. At least one of the surfaces of each of the first and second metal strips may be at least partially covered by an insulating material.

DETAILED DESCRIPTION

Figure 1:
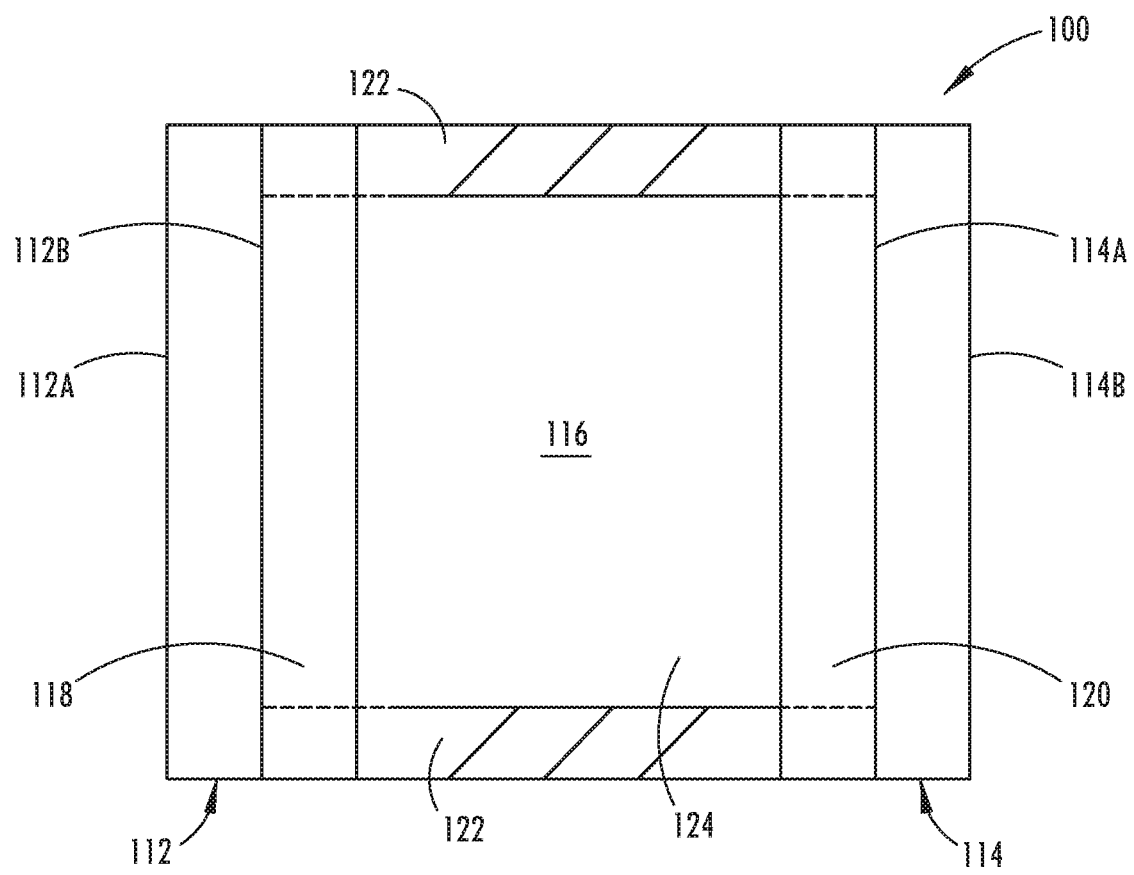
FIG. 1 is a cross-sectional schematic representation of an electro-optic device in accordance with the present disclosure.

FIG. 1 shows a cross-sectional schematic representation of electro-optic device 100, which generally comprises first substrate 112 having front surface 112A and rear surface 112B, second substrate 114 having front surface 114A and rear surface 114B, and a chamber 116 for containing an electrochromic medium 124.

One or more layers of electrically conductive material or electrode coatings 118 may be associated with rear surface 112B of first substrate 112. These layers may serve as an electrode for electro-optic device 100. Electrically conductive material 118 may be a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within electro-optic device 100 or the atmosphere; and (e) exhibits minimal diffusion or specular reflectance as well as sufficient electrical conductance. Electrically conductive material 118 may be fabricated from fluorine doped tin oxide (FTO), indium/tin oxide (ITO), doped zinc oxide or other materials known to those having ordinary skill in the art.

Similarly, one or more layers of electrically conductive material 120 may be associated with front surface 114A of second substrate 114, and may be operatively bonded to electrically conductive material 118 by sealing member 122. As can be seen in FIG. 1, once bonded, sealing member 122 and the juxtaposed portions of electrically conductive materials 118 and 120 serve to define an inner peripheral geometry of chamber 116.

Sealing member 122 may comprise any material that is capable of being adhesively bonded to the electronically conductive materials 118 and 120 to, in turn, seal chamber 116 so that electrochromic medium 124 does not inadvertently leak out of chamber 116. As is shown in dashed lines in FIG. 1, it is also contemplated that the sealing member extend all the way to rear surface 112B and front surface 114A of their respective substrates 112, 114. In such an embodiment, the layers of electrically conductive material 118 and 120 may be partially removed where the sealing member 122 is positioned. If electrically conductive materials 118 and 120 are not associated with their respective substrates 112, 114, then sealing member 122 preferably bonds well to glass. It will be understood that sealing member 122 can be fabricated from any one of a number of materials including, for example, those disclosed in U.S. Pat. Nos. 4,297,401; 4,418,102; 4,695,490; 5,596,023, 5,596,024; 4,297,401, and 6,157,480, all of which are incorporated herein by reference in their entirety. In some embodiments, sealing member 122 may comprise a silver-doped epoxy.

Figure 2:
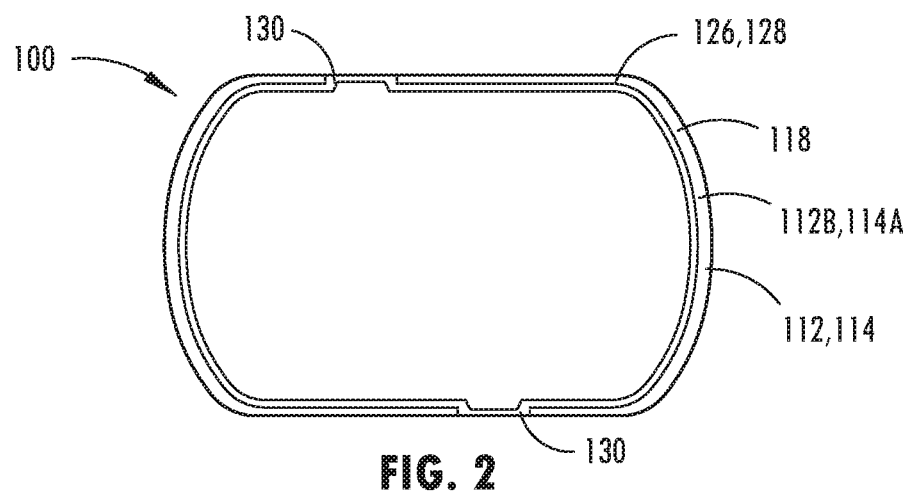
FIG. 2 is a top view of an embodiment of the rear surface of the first substrate or the front surface of the second substrate of FIG. 1.
Figure 3:
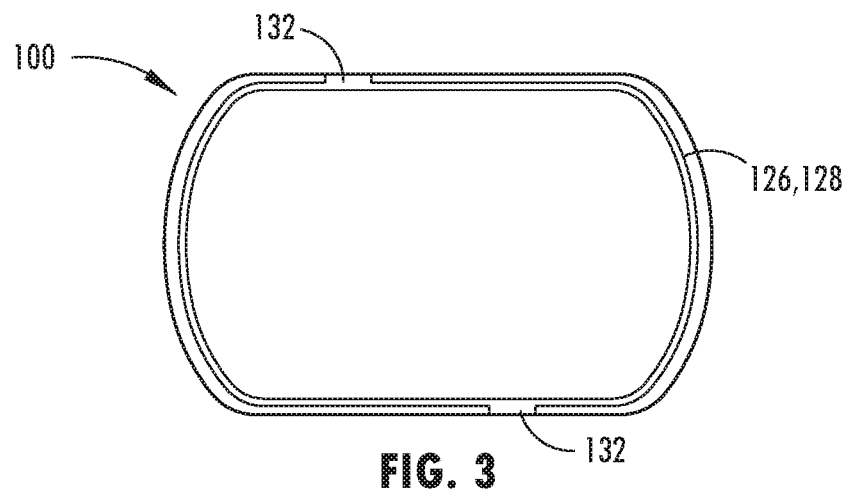
FIG. 3 is a top view of an embodiment of the rear surface of the first substrate or the front surface of the second substrate of FIG. 1.
Figure 4:
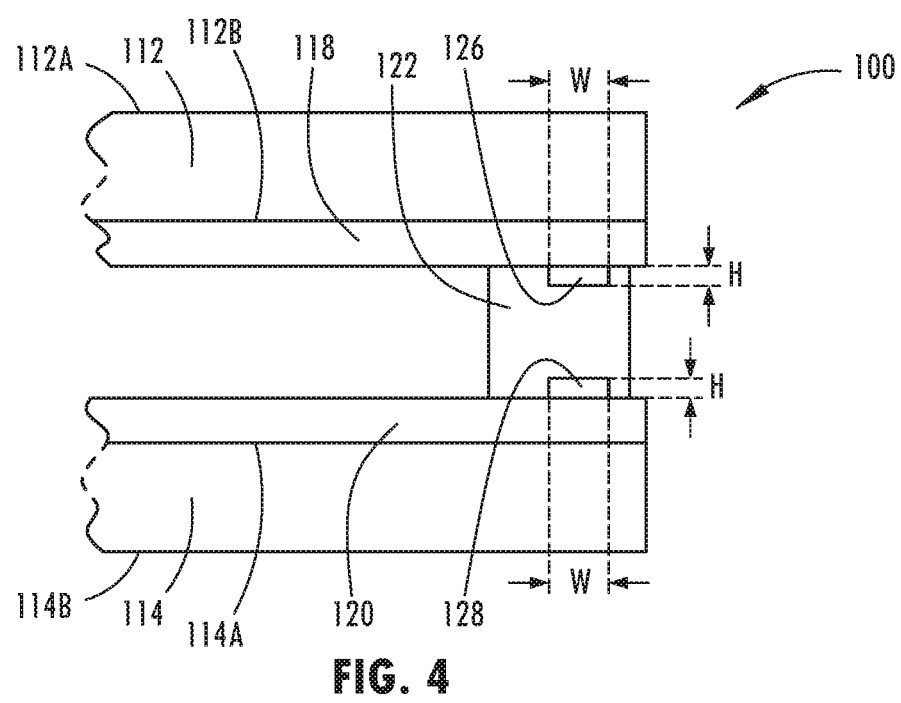
FIG. 4 is a schematic representation of a side view of an embodiment of the bus bar/seal assembly of electro-optic device of FIG. 1.

Referring now to FIGS. 2-4, in some embodiments, a first metal strip 126 having a first side and a second side may extend around a perimeter of first substrate 112. First metal strip 126 may be disposed on and adhered to the one or more layers of electrically conductive material. Alternatively or additionally, first metal strip 126 may be disposed on and adhered directly to first substrate 112.

Similar to first metal strip, in some embodiments, a second metal strip 128 having a first side and a second side may extend around a perimeter of second substrate 114. Second metal strip may be disposed on and adhered to the one or more layers of electrically conductive material. Alternatively or additionally, second metal strip 126 may be disposed on and adhered directly to second substrate 114. In some embodiments, electro-optic device 100 may have both first metal strip 126 disposed on and extending around the perimeter of first substrate 112 and second metal strip disposed on and extending around the perimeter of second substrate 114.

First and second metal strips 126, 128 may comprise strips of any conductive metal, such as silver, platinum, palladium, copper, or tin. In some embodiments, first and second metal strips 126, 128 may comprise tin-plated copper. First and second metal strips 126, 128 may be, for example, Tin-Plated Copper Foil Tape 1183 manufactured by 3M® First and second metal strips 126, 128 do not require a thermal cure and do not contain solvents, thereby requiring fewer process steps for the manufacture of electro-optic device 100 when compared to current manufacturing methods.

An adhesive may be disposed on and adhered to first side of at least one of first and second metal strips 126, 128. The adhesive may be a conductive adhesive. The adhesive may adhere at least one of first and second metal strips 126, 128 to rear surface 112B of first substrate 112 and front surface 114A of second substrate 114 respectively. In some embodiments, the adhesive may be a silver loaded adhesive.

Sealing member 122 may extend between first and second metal strips 126, 128, preventing them from contacting one another, while providing a seal to chamber 116 to prevent electrochromic fluid 124 from leaking from chamber 116.

First and second metal strips 126, 128 have a width W as shown in FIG. 4. In some embodiments, first and second metal strips 126, 128 have a width W of about 0.1 inch or less. In some embodiments, first and second metal strips 126, 128 have a width of about 0.0625 inch or less. The narrow width of first and second metal strips 126, 128 may enable the strip to be bent tightly around small radii without "puckering" or becoming raised from surface 112B, 114A of first or second substrate 112, 114, which may result in electrical shorting of electro-optic device 100.

Figure 6:
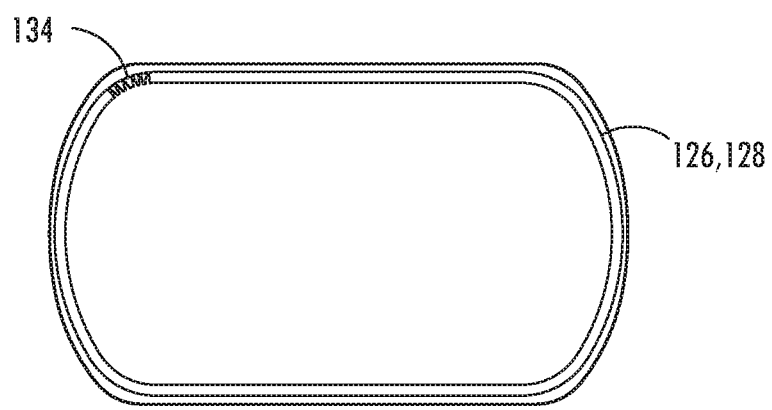
FIG. 6 is a top view of an embodiment of the metal strip on a surface of a substrate of FIG. 1.

In some embodiments, at least a portion 134 of first and second metal strips 126, 128 may have a serrated edge or may have notches cut along an edge 134, as shown in FIG. 6. The notched or serrated portion 134 of the edge may allow first and second metal strips 126, 128 to be bent tightly around small radii without "puckering" or having portions of first and second metal strips 126, 128 becoming raised from the surface 112B, 114A of substrate 112, 114. Additionally or alternatively, first and second metal strips 126, 128 may have cuts that extend partially into the width of first and second metal strips 126, 128 to allow first and second metal strips 126, 128 to be bent around a radius without "puckering."

First and second metal strips 126, 128 have a height H, as shown in FIG. 4. Height H may be the distance first and second metal strips 126, 128 extend above the surface to which first and second metal strips 126, 128 may be adhered, which may be the same as the shortest distance between first and second sides of one of metal strip 126, 128. The surface to which first and second metal strips 126, 128 are adhered may be rear surface 112B of first substrate 112 and front surface 114A of second substrate 114, or it may be the surface of electrically conductive material 118, 120.

In some embodiments, the height H of first and second metal strips 126, 128 may be less than 100 microns and, in some embodiments, may be about 66 microns. In some embodiments, the height of first and second metal strips 126, 128 may be less than 66 microns, and may be about or less than 50 microns. Thus, for example, a busbar comprising one of first and second metal strips 126, 128 may extend only about 66 microns from the surface 112B, 114A of first or second substrate 112, 114. This would allow the cell spacing of electro-optic devices 100 to be significantly reduced. In some embodiments, cell spacing could be reduced to below 350 microns, below 300 microns, below 250 microns, below 200 microns, or below 150 microns. Furthermore, the height of first and second metal strips 126, 128 is generally uniform, so there may be little or no variation in height of the busbar as there is with the current materials.

To eliminate the possibility of electrical shorting, at least one of first and second metal strips 126, 128 may be covered with an insulating cover material (not shown). This insulating material may be adhered to the metal strip by an interposed adhesive layer. The adhesive layer may be in acrylic. The cover material may be comprised of a plastic, such as Kapton or a polyester such polyethylene terephthalate. The cover material may be flexible enough to conform with metal strip as it conforms to small radii bending.

Figure 7:
FIG. 7 is a top view of an embodiment of a metal strip extending around the edge of a substrate and onto a different surface of the substrate.

In some embodiments, at least one wrapping portion 130 of at least one of first and second metal strips 126, 128 may extend outward from sealing member. The at least one wrapping portion 130 of one of metal strips 126, 128 may extend beyond sealing member 122 and around a portion of the edge of first or second substrate 112, 114 to adhere to a portion of front surface 112A of first substrate 112 or rear surface 114B of second substrate 114. In some embodiments, at least one wrapping portion 130 extends from each of first and second metal strip 126, 128. Each of the at least one wrapping portions 130 from each of first and second metal strip 126, 128 may extend beyond sealing member 122 and around a portion of the edge of first and second substrates 112, 114 respectively to be adhered to a portion of front surface 112A of first substrate 112 and rear surface 114B of second substrate 14 respectively as shown in FIGS. 2 and 7. The at least one wrapping portion 130 of at least one of first and second metal strips 126, 128 that extends to one of front surface 112A of first surface 112 and rear surface 114B of second substrate 114 may be capable of acting as an attachment point for soldering, clipping or otherwise attaching wires to electro-optic device 100. In some embodiments, at least one wrapping portion 130 of first and second metal strips 126, 128 may be soldered to directly, thereby eliminating the necessity of adding an attachment point for soldering.

Figure 5:
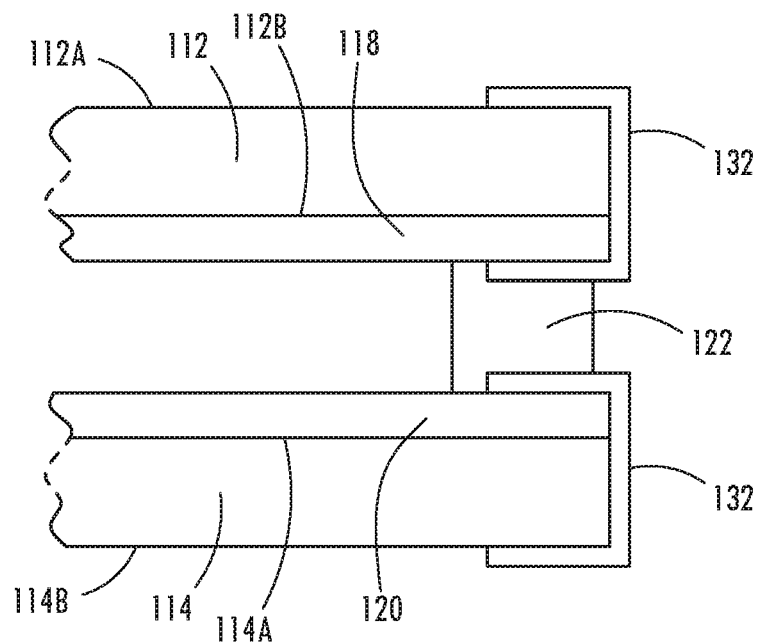
FIG. 5 is a schematic representation of a side view of an embodiment of the electro-optic device of FIG. 1.

In some embodiments, at least one of first and second metal strips 126, 128 may have at least one wide portion 132 as shown in FIGS. 3 and 5. The at least one wide portion 132 may be configured to extend out from sealing member. The at least one wide portion 132 may extend around the edge of first or second substrate 112, 114 and a portion of at least one wide portion 132 may adhere to one the front surface 112A of first substrate 112 or front surface 114B of second substrate 114. Thus, although the width W of most of the length of first or second metal strip 126, 128 may be less than 0.1 inch or about or less than 0.0625 inch, at least one wide portion of first or second metal strip 126, 128 may have a significantly wider width. At least one wide portion 132 may be configured to be operable as an attachment point for wires to be attached to electro-optic device 100, either by soldering, clipping, or other methods of attachment known to those with skill in the art. At least one wide portion 132 of first or second metal strip 126, 128 may be disposed in a portion of metal strip that extends along a relatively straight portion of the perimeter of electro-optic device 100. Thus, there may be no bending required in wide portion 132 of metal strip, so metal strip may lie flat without puckering.

Modifications of the embodiments described herein will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It should be noted that references to "front," "back," "rear," "upward," "downward," "inner," "outer," "right," and "left" in this description are merely used to identify the various elements. These terms are not meant to limit the element which they describe, as the various elements may be oriented differently in various applications.

The invention claimed is:

1. An electro-optic device comprising:
   a first substrate having a front surface and a rear surface and a second substrate having a front surface opposed to the rear surface of the first surface;
   a cavity defined between the rear surface of the first substrate and the opposed front surface of the second substrate;
   an electrically conductive coating disposed on at least one of the rear surface of the first substrate and the front surface of the second substrate;
   a first metal strip having a first surface, a second surface, a thickness measured between the first surface and the second surface, and a width, extending at least partially around a circumference of the rear surface of the first substrate; and
   a sealing member bonding first substrate and second substrate together in a spaced apart relationship;
   wherein the sealing member at least partially covers at least a portion of the second surface of the first metal strip;

wherein the first metal strip has a length;
wherein the first metal strip comprises at least one wide portion along the length, the wide portion of the metal strip being wider than the rest of the metal strip and extending from the sealing member around an edge of the substrate and adhered to the front surface of the substrate, the wide portion having a width that is wider than 0.01 inch.

2. The electro-optic device of claim 1, further comprising a second metal strip having a thickness and a width;
wherein the second metal strip extends at least partially around the circumference of the front surface of the second substrate;
wherein the thickness of the second metal strip is less than 0.006 inches.

3. The electro-optic device of claim 2, wherein at least one of the second surface of the first metal strip and the second metal strip is covered by an insulating material.

4. The electro-optic device of claim 1, wherein the first metal strip comprises a conductive adhesive on the first surface of said first metal strip.

5. The electro-optic device of claim 4, wherein the adhesive is a silver-loaded adhesive.

6. The electro-optic device of claim 1, wherein the width of at least a portion of the first metal strip is less than 0.1 inch.

7. The electro-optic device of claim 1, wherein the first metal strip has a thickness of less than 0.006 inches.

8. The electro-optic device of claim 1, wherein the first metal strip has a thickness of about 0.0026 inches.

9. The electro-optic device of claim 1, further comprising an electrochromic medium disposed within the cavity.

10. A busbar/seal assembly for an electro-optic device comprising:
a first metal strip and a second metal strip, each metal strip having a first side and a second side, and
a sealing member extending between at least a portion of the second side of the first metal strip and at least a portion of the second side of the second metal strip;
wherein both the first metal strip and the second metal strip have a length;
wherein the first metal strip comprises at least one wide portion along the length, the wide portion extending from the sealing member around an edge of a first substrate and adhered to a second surface of the substrate, the wide portion having a width that is significantly wider than 0.01 inch;
wherein the second metal strip comprises at least one wide portion along the length, the wide portion extending from the sealing member around an edge of the substrate and adhered to a second surface of the substrate, the wide portion having a width that is wider than 0.01 inch.

11. The busbar/seal assembly for an electro-optic device of claim 10, further comprising an adhesive layer on the first side of each of first and second metal strips.

12. The busbar/seal assembly for an electro-optic device of claim 10, wherein each of the first and second metal strips has a width; and wherein the width of each of first and second metal strips is less than 0.1 inch.

13. The busbar/seal assembly for an electro-optic device of claim 10, wherein the adhesive is a silver-loaded adhesive.

14. The busbar/seal assembly for an electro-optic device of claim 10, wherein the first and second metal strips each have a thickness; and wherein the thickness of each of the first and second metal strips is less than 0.006 inches.

15. The busbar/seal assembly for an electro-optic device of claim 10, wherein the portion of the at least one of the first and second metal strips extending from the sealing member is configured to act as a solder pad.

16. The electro-optic device of claim 10, wherein at least one of the surfaces of at least one of the metal strips is at least partially covered by an insulating material.

\* \* \* \* \*